(12) United States Patent
Ben Bassat et al.

(10) Patent No.: US 9,813,973 B2
(45) Date of Patent: Nov. 7, 2017

(54) EMBEDDED MILLIMETER-WAVE COMPONENTS

(71) Applicant: Siklu Communication Ltd., Petah Tikva (IL)

(72) Inventors: Itzhak Ben Bassat, Kiryat Ono (IL); Yigal Leiba, Holon (IL)

(73) Assignee: Siklu Communication Ltd., Petach-Tikva (IL)

( * ) Notice: Subject to any disclaimer, the term of this patent is extended or adjusted under 35 U.S.C. 154(b) by 39 days.

(21) Appl. No.: 15/175,582

(22) Filed: Jun. 7, 2016

(65) Prior Publication Data

US 2017/0289897 A1    Oct. 5, 2017

Related U.S. Application Data

(60) Provisional application No. 62/317,566, filed on Apr. 3, 2016.

(51) Int. Cl.
| | |
|---|---|
| *H04W 4/00* | (2009.01) |
| *G08G 1/07* | (2006.01) |
| *H04W 40/22* | (2009.01) |
| *H04W 16/28* | (2009.01) |
| *H04M 1/725* | (2006.01) |
| *H04W 76/02* | (2009.01) |

(52) U.S. Cl.
CPC ............. *H04W 40/22* (2013.01); *G08G 1/07* (2013.01); *H04M 1/72533* (2013.01); *H04W 16/28* (2013.01); *H04W 76/025* (2013.01)

(58) Field of Classification Search
CPC ... H04W 40/22; H04W 16/28; H04W 76/025; H04M 1/72533; H08G 1/07
USPC ......... 370/338; 340/905, 909, 910, 916–928, 340/931–932
See application file for complete search history.

(56) References Cited

U.S. PATENT DOCUMENTS

| | | | | |
|---|---|---|---|---|
| 6,098,734 | A * | 8/2000 | Kawamura | B60K 6/28 180/65.245 |
| 2001/0044315 | A1* | 11/2001 | Aoki | H04L 1/0007 455/524 |
| 2003/0105578 | A1* | 6/2003 | Takenaga | B60W 30/16 701/117 |
| 2005/0280552 | A1* | 12/2005 | DiPiazza | G08G 1/052 340/905 |
| 2005/0280553 | A1* | 12/2005 | DiPiazza | G08G 1/01 340/905 |
| 2007/0087756 | A1* | 4/2007 | Hoffberg | G06Q 10/0631 455/450 |

(Continued)

*Primary Examiner* — Thai Hoang
(74) *Attorney, Agent, or Firm* — Active Knowledge Ltd.

(57) ABSTRACT

Various systems and methods for facilitating operation of a millimeter-wave communication component in conjunction with another component, in which the millimeter-wave communication component is mechanically fixed to or with the other components and is therefore oriented in a certain direction that is not necessarily aligned with a target node. The embedded millimeter-wave communication component compensates for said orientation by steering, electronically, a millimeter-wave beam toward the target node. The millimeter-wave communication component may be embedded in or with the other component using a built-in connector, or it may be a-priori embedded in or with the other component.

20 Claims, 5 Drawing Sheets

(56) References Cited

U.S. PATENT DOCUMENTS

| | | | | |
|---|---|---|---|---|
| 2010/0030434 A1* | 2/2010 | Okabe | ............... | A61B 5/165 |
| | | | | 701/48 |
| 2011/0025529 A1* | 2/2011 | Uechi | ............. | G08G 1/096783 |
| | | | | 340/905 |
| 2013/0231150 A1* | 9/2013 | Bang | ............... | H04W 40/22 |
| | | | | 455/509 |
| 2013/0321225 A1* | 12/2013 | Pettus | ............... | H01Q 3/08 |
| | | | | 343/765 |
| 2014/0015693 A1* | 1/2014 | Komoguchi | ......... | G08G 1/167 |
| | | | | 340/935 |
| 2014/0046581 A1* | 2/2014 | Ota | ............... | G08G 1/096716 |
| | | | | 701/408 |
| 2015/0346320 A1* | 12/2015 | Hartman | ........... | H05B 37/0227 |
| | | | | 315/312 |
| 2016/0095121 A1* | 3/2016 | Negus | ............... | H04W 76/025 |
| | | | | 370/280 |
| 2016/0148511 A1* | 5/2016 | Shibata | ............... | G08G 1/162 |
| | | | | 701/119 |
| 2016/0335892 A1* | 11/2016 | Okada | ............... | B60T 7/22 |

\* cited by examiner

EMBEDDED MILLIMETER-WAVE COMPONENTS

TECHNICAL FIELD

Some of the disclosed embodiments relate to communication systems and networking, and more specifically to millimeter-wave communication systems and wireless networking.

BACKGROUND

Fixed wireless networks transmit data point-to-point through the air over a terrestrial microwave or millimeter-wave platform rather than through copper or optical fiber and typically use a directional antenna on each end of a wireless link. These platforms are designed for outdoor use and to accommodate various distances and bandwidths. The antennas are usually selected to make the beam narrow and thus focus transmit power to their destination, increasing reliability and facilitating range requirements. The links are usually arranged as a point-to-point setup to permit the use of these antennas. The point-to-point setup also permits the link to have better capacity and/or better reach for the same amount of power. However, narrow beams require fine orientation of the directional antennas. Consequently, directional antennas, or directional antennas and associated communication transceivers, are typically kept mechanically separated from any related devices, thus complicating system construction and installation.

SUMMARY

Described herein are systems and methods for (i) facilitating an embedded millimeter-wave communication component, (ii) communicatively connecting mechanically fixed systems to millimeter-wave networks, and (iii) converting various components into nodes of a millimeter-wave networks.

One embodiment is a system operative to facilitate an embedded millimeter-wave communication component. The system includes: (i) a first component operative to perform a certain function, in which the certain function is performed in conjunction with a first spatial location, (ii) a millimeter-wave communication component configured to steer a millimeter-wave beam, and (iii) a mechanical component operative to mechanically fix the first component and the millimeter-wave communication component together, thereby associating said millimeter-wave communication component with the first spatial location. The millimeter-wave communication component is further configured to automatically steer the millimeter-wave beam toward a first millimeter-wave node located in a second spatial location, thereby establishing a first communication link between the first spatial location and the second spatial location, and thereby facilitating communication in conjunction with the certain function and the first spatial location.

One embodiment is a method for communicatively connecting a mechanically fixed system to a millimeter-wave network. The method includes fixing, to a rigid item which is already fixed at a first spatial location, a system comprising a millimeter-wave communication component comprising a first antenna configuration, thereby causing the first antenna configuration to be fixed in a certain orientation that is determined by said rigid item and said fixing. The method further includes compensating, by the millimeter-wave communication component, for said certain orientation in which the first antenna configuration is fixed, by generating, via the first antenna configuration, a millimeter-wave beam, and steering electronically said millimeter-wave beam toward a second spatial location. The method further includes establishing, via the millimeter-wave beam, a first communication link between the system located at the first spatial location and a first millimeter-wave node located at the second spatial location, thereby forming a millimeter wave network in conjunction with the system.

One embodiment is a millimeter-wave sub-system operative to convert a first component into a node of a millimeter-wave network. The system includes: (i) a millimeter-wave communication component, (ii) a first antenna configuration belonging to the millimeter-wave communication component, in which the millimeter-wave communication component is operative to steer a millimeter-wave beam via the first antenna configuration, and (iii) a connector embedded in the millimeter-wave communication component, in which the connector is operative to mechanically fix the millimeter-wave communication component into a first enclosure housing a first component, and to electrically connect the millimeter-wave communication component to the first component. The millimeter-wave communication component is configured to receive, via the connector, electrical power from the first component. The millimeter-wave communication component, once receiving electrical power from the first component, is further configured to automatically steer the millimeter-wave beam toward a first millimeter-wave node, thereby establishing a first communication link between the millimeter-wave communication component and the first millimeter-wave node, in which said first communication link belongs to a millimeter-wave network, and the millimeter-wave communication component is further configured to relay data, via the connector, between the millimeter-wave network and the first component, thereby making the first component an additional node of said millimeter-wave network.

BRIEF DESCRIPTION OF THE DRAWINGS

The embodiments are herein described by way of example only, with reference to the accompanying drawings. No attempt is made to show structural details of the embodiments in more detail than is necessary for a fundamental understanding of the embodiments. In the drawings.

DETAILED DESCRIPTION

Figure 1A:
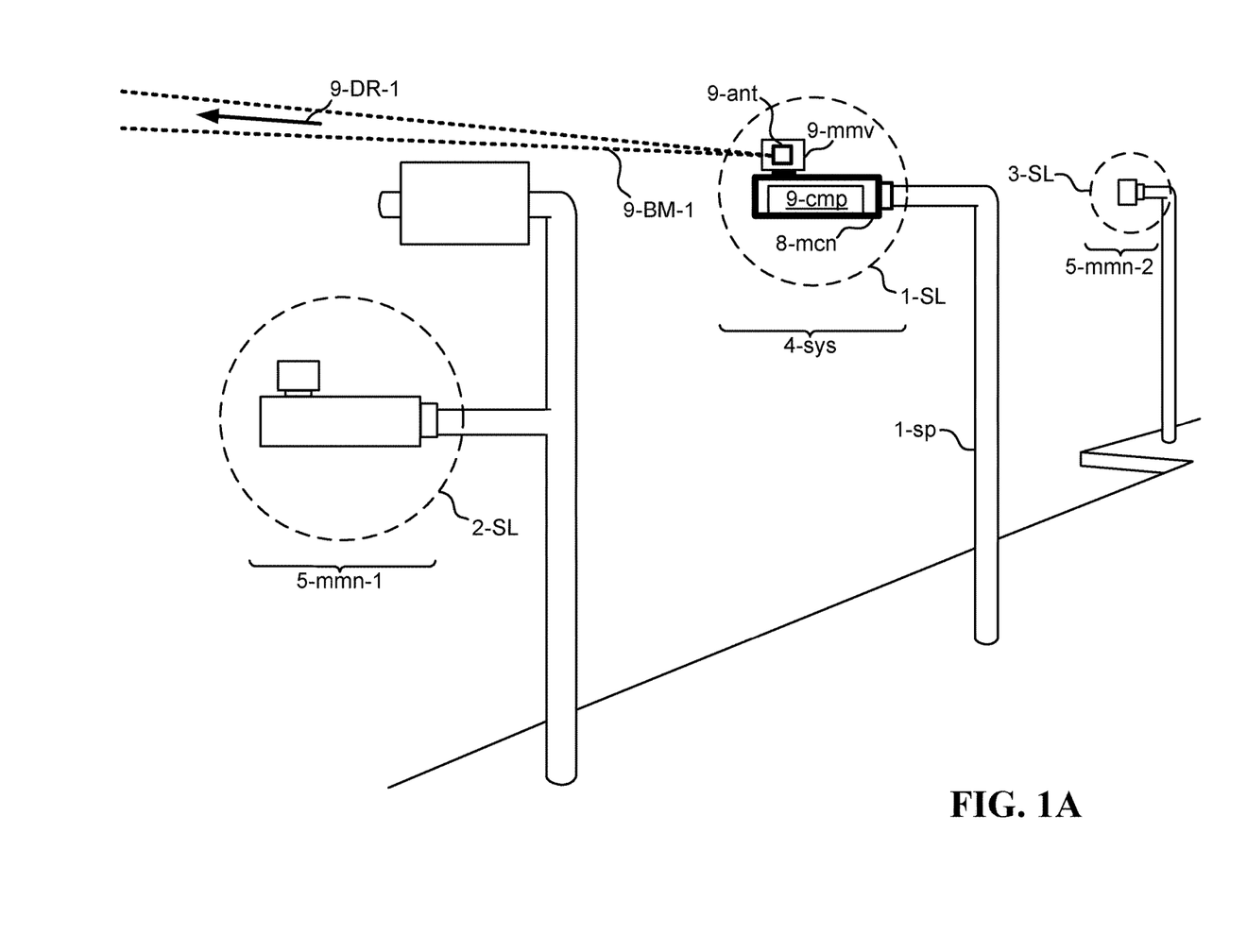
FIG. 1A illustrates one embodiment of an embedded millimeter-wave communication component, in which the embedded millimeter-wave communication component is mechanically fixed to another components and is therefore oriented in a certain direction that is not necessarily aligned with a target node.

FIG. 1A illustrates one embodiment of a millimeter-wave communication component 9-*mmv* comprising an antenna configuration 9-*ant*, in which the millimeter-wave communication component is mechanically fixed to another components 9-*cmp* via a rigid mechanical element 8-*mcn*, and is therefore oriented, together with the antenna configuration 9-*ant*, in a certain direction that is not necessarily aligned with a target node 5-*mmn*-1, 5-*mmn*-2 A system 4-*sys* comprising the millimeter-wave communication component 9-*mmv*, is fixed to a rigid item 1-*sp* (e.g., a street pole) which is already fixed at a first spatial location 1-SL (in this example, the end of the street pole is fixed at a certain elevation above a certain point in the street), thereby causing the first antenna configuration 9-*ant* to be fixed at the certain spatial location 1-SL and in a certain orientation 9-DR-1 that are determined by the rigid item 1-*sp* and by the fixing of system 4-*sys* to the rigid item. A beam 9-BM-1 generated by the antenna configuration 9-*ant* in direction 9-DR-1, or in a direction associated with direction 9-DR-1, would not necessarily cover the target node 5-*mmn*-1 located at spatial location 2-SL, or the target node 5-*mmn*-2 located at spatial location 3-SL, thereby preventing system 4-*sys* from establishing a millimeter-wave communication link with any of the target nodes 5-*mmn*-1, 5-*mmn*-2.

Figure 1B:
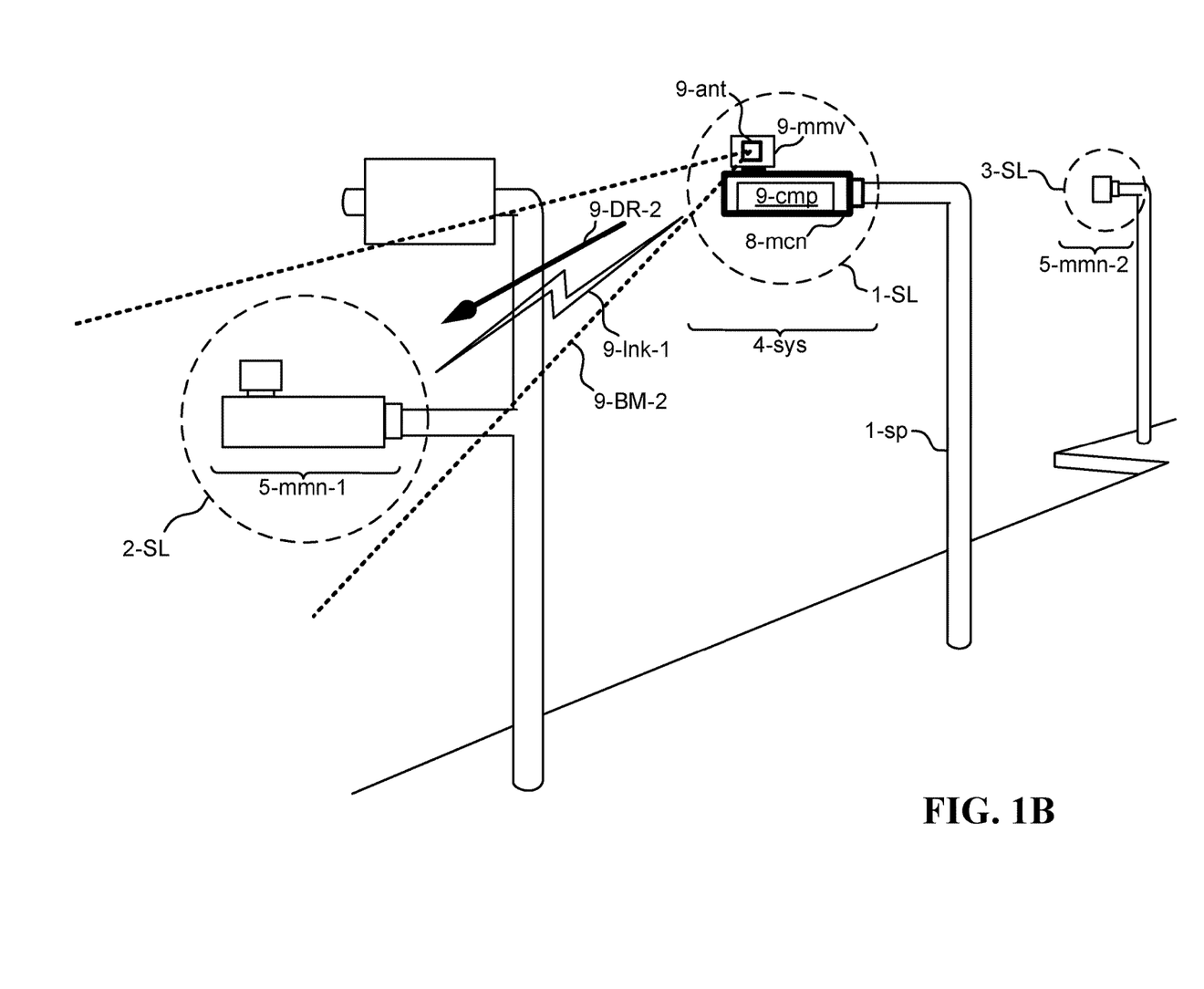
FIG. 1B illustrates one embodiment of the embedded millimeter-wave communication component, in which the embedded millimeter-wave communication component compensates for said orientation by steering, electronically, a millimeter-wave beam toward the target node.

FIG. 1B illustrates one embodiment of the millimeter-wave communication component 9-*mmv*, in which the millimeter-wave communication component compensates for said orientation 9-DR-1 (FIG. 1A) by steering, electronically, a millimeter-wave beam 9-BM-2 in direction of 9-DR-2 the target node 5-*mmn*-1 The system 4-*sys* then establishes, via the millimeter-wave beam 9-BM-2, a first communication link 9-*lnk*-1 with the target node 5-*mmn*-1, thereby forming a millimeter wave network 4-*sys*, 9-*lnk*-1, 5-*mmn*-1

Figure 1C:
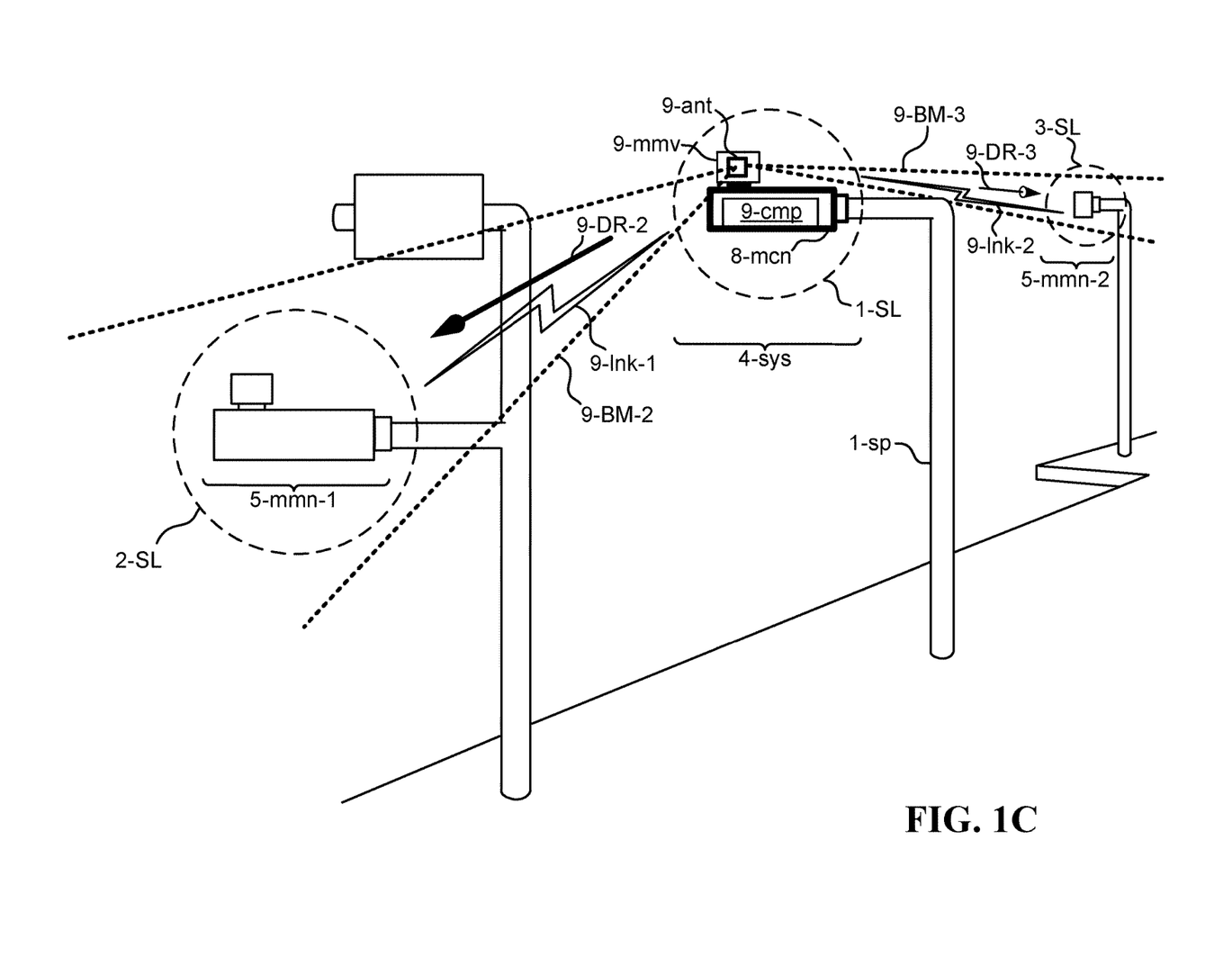
FIG. 1C illustrates one embodiment of the embedded millimeter-wave communication component, in which the embedded millimeter-wave communication component compensates, again, for said orientation by steering, again, the millimeter-wave beam, or another millimeter-wave beam, toward yet another target node.

FIG. 1C illustrates one embodiment of the millimeter-wave communication component 9-*mmv*, in which the millimeter-wave communication component compensates, again, for said orientation 9-DR-1 (FIG. 1A) by steering, again, the millimeter-wave beam, or another millimeter-wave beam 9-BM-3, in direction of 9-DR-3 yet another target node 5-*mmn*-2 The system 4-*sys* then establishes, via the millimeter-wave beam 9-BM-3, a second communication link 9-*lnk*-2 with the target node 5-*mmn*-2, thereby forming a larger millimeter-wave network 4-*sys*, 9-*lnk*-1, 5-*mmn*-1, 9-*lnk*-2, 5-*mmn*-2.

Figure 2A:
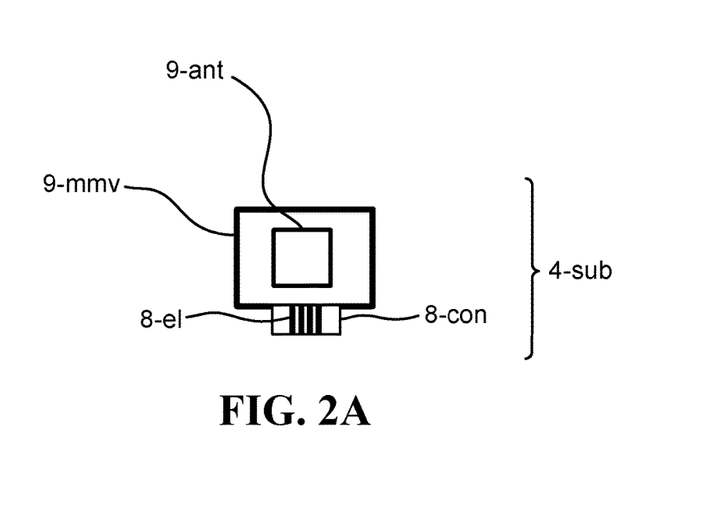
FIG. 2A illustrates one embodiment of a millimeter-wave communication component to be embedded in another component, using a built-in connector.

FIG. 2A illustrates one embodiment of a millimeter-wave communication component 9-*mmv* comprising an antenna configuration 9-*ant*, to be embedded in or with another component, using a built-in connector 8-*con* operative to (i) mechanically fix the millimeter-wave communication component to the other component or to an enclosure of the other component, and (ii) electrically connect 8-*el* the millimeter-wave communication component with the other component. The millimeter-wave communication component 9-*mmv* comprising an antenna configuration 9-*ant* and the built-in connector 8-*con* together constitute a millimeter-wave subsystem 4-*sub*.

Figure 2B:
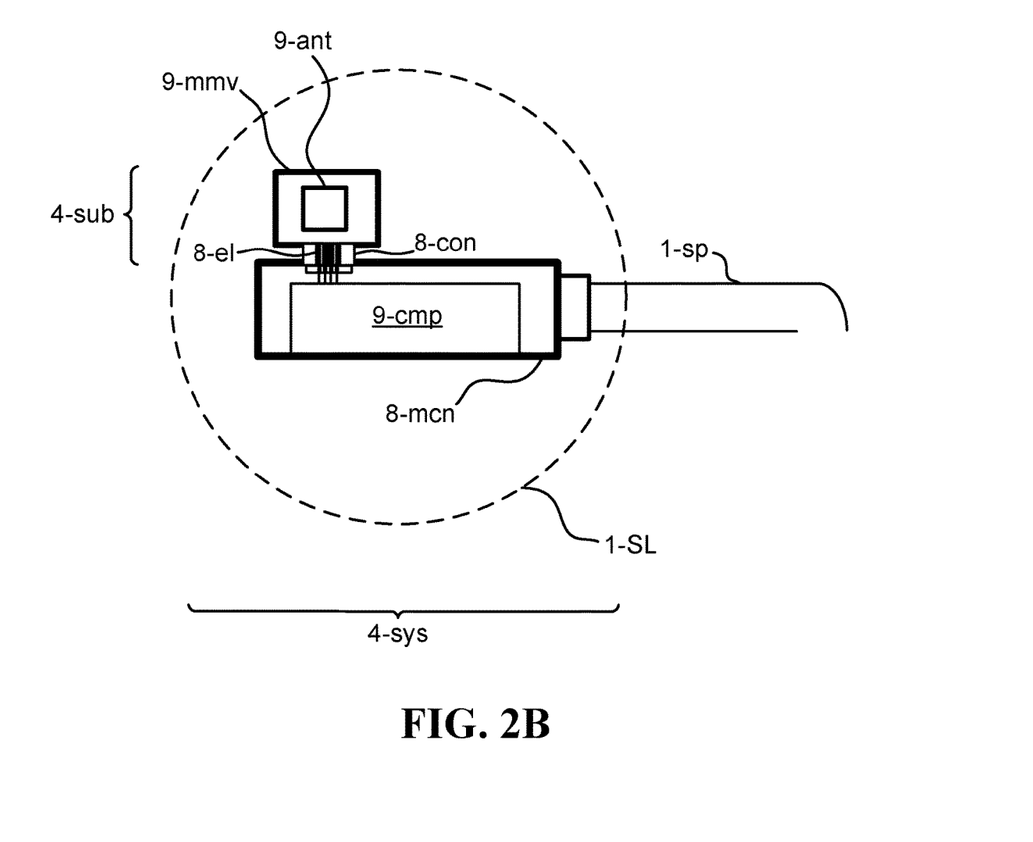
FIG. 2B illustrates one embodiment of the millimeter-wave communication component, now embedded in the other component via the built-in connector.

FIG. 2B illustrates one embodiment of the millimeter-wave communication component 9-*mmv*, now embedded with the other component 9-*cmp* via the built-in connector 8-*con* in an enclosure 8-*mcn* of the other component 9-*cmp*, thereby constituting together a complete and rigid system 4-*sys* which is fixed at a first spatial location 1-SL to a rigid item 1-*sp*, in which the connector 8-*con* electrically connects 8-*el* the millimeter-wave communication component 9-*mmv* with the other component 9-*cmp*.

One embodiment is a system 4-*sys* operative to facilitate an embedded millimeter-wave communication component. The system includes: (i) a first component 9-*cmp* operative to perform a certain function, in which the certain function is performed in conjunction with a first spatial location 1-SL, (ii) a millimeter-wave communication component 9-*mmv* configured to steer 9-DR-1, 9-DR-2 a millimeter-wave beam 9-BM-1, 9-BM-2, and (iii) a mechanical component 8-*mcn* operative to mechanically fix the first component 9-*cmp* and the millimeter-wave communication component 9-*mmv* together, thereby associating said millimeter-wave communication component with the first spatial location 1-SL. The millimeter-wave communication component 9-*mmv* is further configured to automatically steer (e.g., from direction 9-DR-1 to direction 9-DR-2) the millimeter-wave beam 9-BM-1, 9-BM-2 toward a first millimeter-wave node 5-*mmn*-1 located in a second spatial location 2-SL, thereby establishing a first communication link 9-*lnk*-1 between the first spatial location 1-SL and the second spatial location 2-SL, and thereby facilitating communication in conjunction with the certain function and the first spatial location.

In one embodiment, the first millimeter-wave node 5-*mmn*-1 is selected from a group comprising: (i) a network gateway, (ii) an access point belonging to a radio-access-network, (iii) a millimeter-wave enabled mobile device, and (iv) a communication element in a wired network.

In one embodiment, the first component 9-*cmp* is a backhaul communication component, the certain function is backhaul communication, the mechanical component 8-*mcn* is a mechanical enclosure, the first spatial location 1-SL is an elevated position in a street, the second spatial location 2-SL is another position in the street, the first millimeter-wave node 5-*mmn*-1 is a millimeter-wave enabled mobile device, and said communication is operative to facilitate data transport between the backhaul communication component and the millimeter-wave enabled mobile device.

In one embodiment, the first component 9-*cmp* is a street light, the certain function is outdoor illumination, the mechanical component 8-*mcn* is a street light enclosure, the first spatial location 1-SL is a certain position on a street pole 1-*sp*, and said communication is operative to facilitate control of the outdoor illumination via the second spatial location 2-SL.

In one embodiment, the first component 9-*cmp* is a traffic light or a traffic sign, the certain function is traffic control, the mechanical component 8-*mcn* is a rigid construction, the first spatial location 1-SL is a certain position on a street pole 1-*sp* which is a traffic pole, and said communication is operative to facilitate control of the traffic light or the traffic sign.

In one embodiment, said first communication link 9-*lnk*-1 is operative to facilitate broadband communication between the first spatial location 1-SL and the second spatial location 2-SL. In one embodiment, the millimeter-wave communication component 9-*mmv* is further configured to automatically steer the millimeter-wave beam 9-BM-2 or a different millimeter-wave beam 9-BM-3 toward a second millimeter-wave node 5-*mmn*-2 located in a third spatial location 3-SL, thereby establishing a second communication link 9-*lnk*-2 between the first spatial location 1-SL and the third spatial location 3-SL. In one embodiment, the system 4-*sys* is operative to relay said broadband communication between the first millimeter-wave node 5 -*mmn*-1 and the second millimeter-wave node 5-*mmn*-2, using the first communication link 9-*lnk*-1 and the second communication link 9-*lnk*-2.

In one embodiment, the mechanical component 8-*mcn* holds or contains the first component 9-*cmp* and the millimeter-wave communication component 9-*mmv*, such as to make the entire system 4-*sys* a single mechanically rigid item. In one embodiment, the system 4-*sys* further comprising a first antenna configuration 9-*ant* belonging to the millimeter-wave communication component 9-*mmv* and operative to facilitate creation of the millimeter-wave beam 9-BM-1, 9-BM-2, wherein said antenna configuration 9-*ant* is mechanically fixed to the millimeter-wave communication component 9-*mmv*, and is therefore lacking any mechanical degrees of freedom in respect to the spatial orientation of the system 4-*sys* which is determined solely in conjunction with the certain function, and therefore said steering 9-DR-1, 9-DR-2 of the millimeter-wave beam 9-BM-1, 9-BM-2 is operative to circumvent said lacking of mechanical degrees of freedom, and consequently allow said establishing of the first communication link 9-*lnk*-1 between the first spatial location 1-SL and the second spatial location 2-SL.

In one embodiment, the mechanical component 8-*mcn* is an enclosure, and both the first component 9-*cmp* and the millimeter-wave communication component 9-*mmv* are enclosed by said enclosure, thereby embedding the millimeter-wave communication component 9-*mmv* in the system 4-*sys*.

In one embodiment, the mechanical component 8-*mcn* is an enclosure, the first component 9-*cmp* is enclosed by said enclosure, and the millimeter-wave communication component 9-*mmv* is mechanically fixed to an outer surface of said enclosure, thereby embedding the millimeter-wave communication component 9-*mmv* in the system 4-*sys*.

Figure 3:
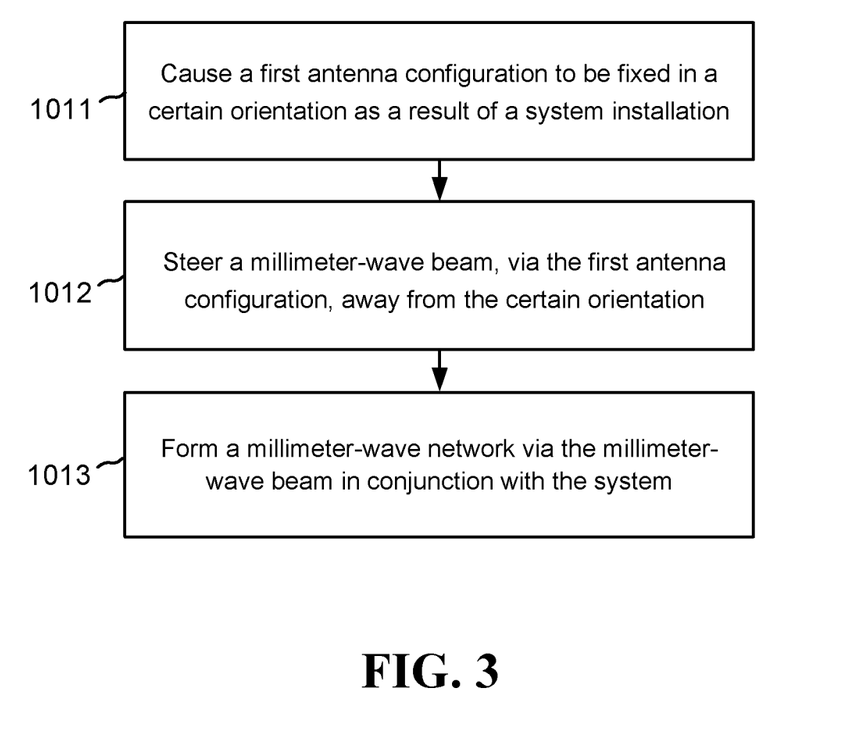
FIG. 3 illustrates one embodiment of a method for communicatively connecting a mechanically fixed system to a millimeter-wave network.

FIG. 3 illustrates one embodiment of a method for communicatively connecting a mechanically fixed system to a millimeter-wave network. The method includes: In step 1011, fixing, to a rigid item 1-*sp* which is already fixed at a first spatial location 1-SL, a system 4-*sys* comprising a millimeter-wave communication component 9-*mmv* comprising a first antenna configuration 9-*ant,* thereby causing the first antenna configuration to be fixed in a certain orientation 9-DR-1 that is determined by said rigid item 1-*sp* and said fixing. In step 1012, compensating, by the millimeter-wave communication component 9-*mmv,* for said certain orientation 9-DR-1 in which the first antenna configuration 9-*ant* is fixed, by generating, via the first antenna configuration, a millimeter-wave beam 9-BM-1, 9-BM-2, and steering electronically (e.g., from direction 9-DR-1 to direction 9-DR-2) said millimeter-wave beam toward a second spatial location 2-SL. In step 1013, establishing, via the millimeter-wave beam 9-BM-2, a first communication link 9-*lnk*-1 between the system 4-*sys* located at the first spatial location 1-SL and a first millimeter-wave node 5-*mmn*-1 located at the second spatial location 2-SL, thereby forming a millimeter wave network 4-*sys*, 9-*lnk*-1, 5-*mmn*-1 in conjunction with the system.

In one embodiment, said steering electronically of the millimeter-wave beam 9-BM-1, 9-BM-2 toward the second spatial location 2-SL, is achieved using a beam steering technique selected from a group comprising: (i) phased array beam steering, (ii) beam switching, and (iii) a combination of phased array beam steering and beam switching.

One embodiment is a millimeter-wave sub-system 4-*sub* operative to convert a first component into a node of a millimeter-wave network. The system includes: (i) a millimeter-wave communication component 9-*mmv*, (ii) a first antenna configuration 9-*ant* belonging to the millimeter-wave communication component 9-*mmv*, in which the millimeter-wave communication component is operative to steer a millimeter-wave beam 9-BM-1, 9-BM-2 via the first antenna configuration 9-*ant,* and (iii) a connector 8-*con* embedded in the millimeter-wave communication component 9-*mmv,* in which the connector is operative to mechanically fix the millimeter-wave communication component 9-*mmv* into a first enclosure 8-*mcn* housing a first component 9-*cmp,* and to electrically connect 8-*el* the millimeter-wave communication component 9-*mmv* to the first component 9-*cmp*. The millimeter-wave communication component 9-*mmv* is configured to receive, via the connector 8-*con,* electrical power from the first component 9-*cmp*. The millimeter-wave communication component 9-*mmv,* once receiving electrical power from the first component 9-*cmp,* is further configured to automatically steer (e.g., from direction 9-DR-1 to direction 9-DR-2) the millimeter-wave beam 9-BM-1, 9-BM-2 toward a first millimeter-wave node 5-*mmn*-1, thereby establishing a first communication link 9-*lnk*-1 between the millimeter-wave communication component 9-*mmv* and the first millimeter-wave node 5-*mmn*-1, in which said first communication link 9-*lnk*-1 belongs to a millimeter-wave network 9-*mmv,* 9-*lnk*-1, 5-*mmn*-1, and the millimeter-wave communication component 9-*mmv* is further configured to relay data, via the connector 8-*con,* between the millimeter-wave network and the first component 9-*cmp,* thereby making the first component an additional node of said millimeter-wave network.

In one embodiment, the first component 9-*cmp* is a street light operative to provide outdoor illumination, and said first communication link 9-*lnk*-1 is operative to facilitate control of the outdoor illumination.

In one embodiment, the first component 9-*cmp* is a traffic light or a traffic sign operative to provide traffic control, and said first communication link 9-*lnk*-1 is operative to facilitate control of the traffic light or the traffic sign.

In one embodiment, said first communication link 9-*lnk*-1 is operative to facilitate broadband communication between the first millimeter-wave node 5-*mmn*-1 and the millimeter-wave communication component 9-*mmv*. In one embodiment, the millimeter-wave communication component 9-*mmv* is further configured to automatically steer (e.g., from direction 9-DR-2 to direction 9-DR-3) the millimeter-wave beam 9-BM-2 or a different millimeter-wave beam 9-BM-3 toward a second millimeter-wave node 5-*mmn*-2, thereby establishing a second communication link 9-*lnk*-2 between the millimeter-wave communication component 9-*mmv* and the second millimeter-wave node 5 -*mmn*-2 In one embodiment, the millimeter-wave communication component 9-*mmv* is further configured to relay said broadband communication between the first millimeter-wave node 5-*mmn*-1 and the second millimeter-wave node 5 -*mmn*-2, using the first communication link 9-*lnk*-1 and the second communication link 9-*lnk*-2.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this

What is claimed is:

1. A system operative to facilitate an embedded millimeter-wave communication component, comprising:
   a first component operative to perform a certain function, in which the certain function is performed in conjunction with a first spatial location;
   a millimeter-wave communication component configured to steer a millimeter-wave beam; and
   a mechanical component operative to mechanically fix the first component and the millimeter-wave communication component together, thereby associating said millimeter-wave communication component with the first spatial location;
   wherein the millimeter-wave communication component is further configured to automatically steer the millimeter-wave beam toward a first millimeter-wave node located in a second spatial location, thereby establishing a first communication link between the first spatial location and the second spatial location, and thereby facilitating communication in conjunction with the certain function and the first spatial location.

2. The system of claim 1, wherein the first millimeter-wave node is selected from a group comprising: (i) a network gateway, (ii) an access point belonging to a radio-access-network, (iii) a millimeter-wave enabled mobile device, and (iv) a communication element in a wired network.

3. The system of claim 1, wherein:
   the first component is a backhaul communication component;
   the certain function is backhaul communication;
   the mechanical component is a mechanical enclosure;
   the first spatial location is an elevated position in a street;
   the second spatial location is another position in the street;
   the first millimeter-wave node is a millimeter-wave enabled mobile device; and
   said communication is operative to facilitate data transport between the backhaul communication component and the millimeter-wave enabled mobile device.

4. The system of claim 1, wherein:
   the first component is a street light;
   the certain function is outdoor illumination;
   the mechanical component is a street light enclosure;
   the first spatial location is a certain position on a street pole; and
   said communication is operative to facilitate control of the outdoor illumination via the second spatial location.

5. The system of claim 1, wherein:
   the first component is a traffic light or a traffic sign;
   the certain function is traffic control;
   the mechanical component is a rigid construction;
   the first spatial location is a certain position on a street pole which is a traffic pole; and
   said communication is operative to facilitate control of the traffic light or the traffic sign.

6. The system of claim 1, wherein said first communication link is operative to facilitate broadband communication between the first spatial location and the second spatial location.

7. The system of claim 6, wherein the millimeter-wave communication component is further configured to automatically steer the millimeter-wave beam or a different millimeter-wave beam toward a second millimeter-wave node located in a third spatial location, thereby establishing a second communication link between the first spatial location and the third spatial location.

8. The system of claim 7, wherein the system is operative to relay said broadband communication between the first millimeter-wave node and the second millimeter-wave node, using the first communication link and the second communication link.

9. The system of claim 1, wherein the mechanical component holds or contains the first component and the millimeter-wave communication component, such as to render the entire system a single mechanically rigid item.

10. The system of claim 9, further comprising a first antenna configuration belonging to the millimeter-wave communication component and operative to facilitate creation of the millimeter-wave beam, wherein said antenna configuration is mechanically fixed to the millimeter-wave communication component, and is therefore lacking any mechanical degrees of freedom in respect to the spatial orientation of the system which is determined solely in conjunction with the certain function, and therefore said steering of the millimeter-wave beam is operative to circumvent said lacking of mechanical degrees of freedom, and consequently allow said establishing of the first communication link between the first spatial location and the second spatial location.

11. The system of claim 1, wherein:
the mechanical component is an enclosure; and
both the first component and the millimeter-wave communication component are enclosed by said enclosure, thereby embedding the millimeter-wave communication component in the system.

12. The system of claim 1, wherein:
the mechanical component is an enclosure;
the first component is enclosed by said enclosure; and
the millimeter-wave communication component is mechanically fixed to an outer surface of said enclosure,
thereby embedding the millimeter-wave communication component in the system.

13. A method for communicatively connecting a mechanically fixed system to a millimeter-wave network, comprising:
fixing, to a rigid item which is already fixed at a first spatial location, a system comprising a millimeter-wave communication component comprising a first antenna configuration, thereby causing the first antenna configuration to be fixed in a certain orientation that is determined by said rigid item and said fixing;
compensating, by the millimeter-wave communication component, for said certain orientation in which the first antenna configuration is fixed, by generating, via the first antenna configuration, a millimeter-wave beam, and steering electronically said millimeter-wave beam toward a second spatial location; and
establishing, via the millimeter-wave beam, a first communication link between the system located at the first spatial location and a first millimeter-wave node located at the second spatial location, thereby forming a millimeter wave network in conjunction with the system.

14. The method of claim 13, wherein said steering electronically of the millimeter-wave beam toward the second spatial location, is achieved using a beam steering technique selected from a group comprising: (i) phased array beam steering, (ii) beam switching, and (iii) a combination of phased array beam steering and beam switching.

15. A millimeter-wave sub-system operative to convert a first component into a node of a millimeter-wave network, comprising:
a millimeter-wave communication component;
a first antenna configuration belonging to the millimeter-wave communication component, in which the millimeter-wave communication component is operative to steer a millimeter-wave beam via the first antenna configuration; and
a connector embedded in the millimeter-wave communication component, in which the connector is operative to: (i) mechanically fix the millimeter-wave communication component into a first enclosure housing a first component, and (ii) electrically connect the millimeter-wave communication component to the first component;
wherein:
the millimeter-wave communication component is configured to receive, via the connector, electrical power from the first component; and
the millimeter-wave communication component, once receiving electrical power from the first component, is further configured to automatically steer the millimeter-wave beam toward a first millimeter-wave node, thereby establishing a first communication link between the millimeter-wave communication component and the first millimeter-wave node;
wherein:
said first communication link belongs to a millimeter-wave network; and
the millimeter-wave communication component is further configured to relay data, via the connector, between the millimeter-wave network and the first component, thereby making the first component an additional node of said millimeter-wave network.

16. The millimeter-wave sub-system of claim 15, wherein:
the first component is a street light operative to provide outdoor illumination; and
said first communication link is operative to facilitate control of the outdoor illumination.

17. The millimeter-wave sub-system of claim 15, wherein:
the first component is a traffic light or a traffic sign operative to provide traffic control; and
said first communication link is operative to facilitate control of the traffic light or the traffic sign.

18. The millimeter-wave sub-system of claim 15, wherein said first communication link is operative to facilitate broadband communication between the first millimeter-wave node and the millimeter-wave communication component.

19. The millimeter-wave sub-system of claim 18, wherein the millimeter-wave communication component is further configured to automatically steer the millimeter-wave beam or a different millimeter-wave beam toward a second millimeter-wave node, thereby establishing a second communication link between the millimeter-wave communication component and the second millimeter-wave node.

20. The millimeter-wave sub-system of claim 19, wherein the millimeter-wave communication component is further configured to relay said broadband communication between the first millimeter-wave node and the second millimeter-wave node, using the first communication link and the second communication link.

* * * * *